(12) United States Patent
Lozano et al.

(10) Patent No.: US 9,146,719 B2
(45) Date of Patent: Sep. 29, 2015

(54) DATA LAYOUT USING DATA TYPE INFORMATION

(75) Inventors: Luis A. Lozano, Sunnyvale, CA (US); Robert Hundt, Palo Alto, CA (US); Shin-Ming Liu, Cupertino, CA (US); Sandya S Mannarswamy, Bangalore (IN); Sungdo Moon, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1691 days.

(21) Appl. No.: 11/725,837

(22) Filed: Mar. 20, 2007

(65) Prior Publication Data
US 2008/0235672 A1    Sep. 25, 2008

(51) Int. Cl.
*G06F 9/45*    (2006.01)
(52) U.S. Cl.
CPC .............. *G06F 8/4442* (2013.01); *G06F 8/443* (2013.01)
(58) Field of Classification Search
CPC ....... G06F 8/4442; G06F 8/443; G06F 8/445; G06F 8/447
USPC .......................................... 717/151, 152, 159
See application file for complete search history.

(56) References Cited

U.S. PATENT DOCUMENTS

| | | | | | |
|---|---|---|---|---|---|
| 5,689,702 | A | * | 11/1997 | Bulusu | 707/802 |
| 6,557,078 | B1 | * | 4/2003 | Mulla et al. | 711/122 |
| 6,862,729 | B1 | * | 3/2005 | Kuch et al. | 717/158 |
| 7,143,404 | B2 | | 11/2006 | Haghighat et al. | |
| 2004/0237075 | A1 | * | 11/2004 | Kawahito et al. | 717/159 |
| 2008/0022265 | A1 | * | 1/2008 | Morris | 717/140 |

OTHER PUBLICATIONS

"Whole-Program Optimization of Global Variable Layout" published Sep. 16, 2006 by Nathaniel McIntosh, Sandya Mannarswamy, and Robert Hundt.*
Nathaniel McIntosh, et al. "Whole-Program Optimization of Global Variable Layout", Sep. 2006, pp. 164-172, Seattle, Washington, USA.
Robert Hundt, et al. "Practical Structure Layout Optimization and Advice", 2006 IEEE, pp. 1-12, Proceedings of the International Symposium on Code Generation and Optimization (CGO '06).

* cited by examiner

*Primary Examiner* — Anna Deng
(74) *Attorney, Agent, or Firm* — Okamoto & Benedicto LLP

(57) ABSTRACT

One embodiment relates to a computer-implemented method of compiling a software program into an executable binary file, including determining a data layout in the binary file and a data layout in the executable's dynamically allocated memory. The method includes taking into account data types of data as a factor in determining a data layout for the binary file and for the executable's dynamically allocated memory, wherein the data types include a floating-point data type and a non-floating-point data type. Other embodiments, aspects and features are also disclosed herein.

19 Claims, 5 Drawing Sheets

FIG. 3    300

DATA LAYOUT USING DATA TYPE INFORMATION

BACKGROUND OF THE INVENTION

1. Field of the Invention

The present invention relates generally to computer software.

2. Description of the Background Art

The architecture of many computer systems continues to have a performance bottleneck in the memory system. For example, performance of the memory system is often limited by cache misses and page fault penalties.

In order to improve the performance of the memory system, compilers insert prefetch operations and reorder data accesses to improve locality. More particularly relevant to the present disclosure, compilers can seek to modify an application's data layout to improve locality.

SUMMARY

One embodiment relates to a computer-implemented method of compiling a software program into an executable binary file, including determining a data layout in the binary file and a data layout during the execution of the binary file. Data of a first data type is ordered based on characteristics of the data of the first data type, and, separately, data of a second data type is ordered based on characteristics of the data of the second data type. Said orderings are used when placing said data into the executable binary file and when placing said data in the executable's dynamically allocated memory Another embodiment relates to a computer-readable medium having computer-executable instructions implementing an execution engine for compiling a software program into an executable binary file, including determining a data layout in the binary file and in the executable's dynamically allocated memory. The execution engine includes computer-executable instructions configured to determine ordering of data of a first data type based on characteristics of the data of the first data type, and computer-executable instructions configured to determine ordering of data of a second data type based on characteristics of the data of the second data type. The execution engine also includes computer-executable instructions configured to use said orderings when placing said data into the executable binary file and when placing said data in the executable's dynamically allocated memory.

Another embodiment relates to a computer-readable medium having computer-executable instructions implementing an execution engine. Data of a first data type is laid out within the execution engine, and data of a second data type is also laid out within the execution engine. The data of the first data type is ordered based on affinity and hotness characteristics of the data of the first data type, and the data of the second data type is ordered based on affinity and hotness characteristics of the data of the second data type. The data of the first data type is ordered separately from the data of the second data type.

Another embodiment relates to a computer-implemented method of compiling a software program into an executable binary file, including determining a data layout in the binary file. The method includes taking into account data types of data as a factor in determining a data layout for the binary file and for the executable's dynamically allocated memory, wherein the data types include a floating-point data type and a non-floating-point data type.

Other embodiments, aspects and features are also disclosed herein.

DETAILED DESCRIPTION

Cache-aware data layout optimizations such as cache conscious structure layout and global variable layout have been used for reducing data cache (d-cache) misses by placing frequently accessed data together in memory. Such optimizations have based their placement decisions on hotness and affinity information for the data being accessed.

However, applicants have determined that, at least for the IA-64 processor architecture, it is advantageous to use data type information, such as integer or floating point data types, to guide placement decisions, in addition to using affinity and hotness information. Applicants believe that using data type information for placement decisions turns out to be advantageous because the association of data types with cache memory hierarchy is non-homogeneous. Hence, applicants believe that data layout is further optimized when it takes into consideration data type, in addition to affinity and hotness, in placement decisions.

The present application discloses a method for improved data layout using data type information. In accordance with one embodiment, the method may be applied for compiling programs for execution on processors under the IA-64 architecture, developed by Intel Corporation of Santa Clara, Calif., and the Hewlett Packard Company of Palo Alto, Calif.

Figure 1:
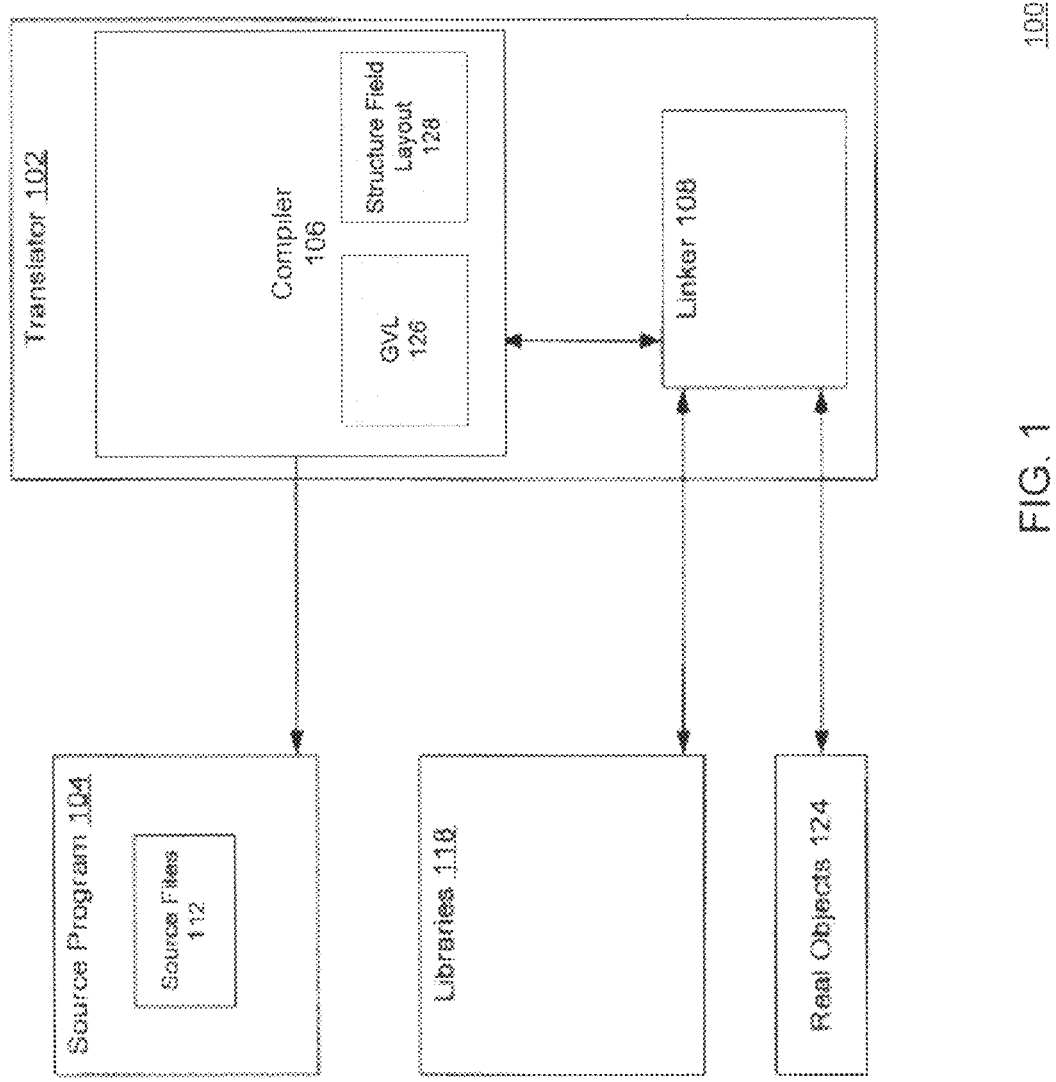
FIG. 1 is a schematic diagram depicting a system for generating a software program executable file in accordance with an embodiment of the invention.

FIG. 1 is a schematic diagram depicting a system 100 for generating a software program executable file in accordance with an embodiment of the invention. The system 100 includes a translator 102 that is used to translate and optimize a source program 104 into executable binary code. The translator 102 includes a compiler 106, and a linker 108. The compiler 106 is configured to translate source files 112 of the source program 104 into object files. The linker 108 is configured to link the various object files, including those compiled by the compiler, into the executable program. The linker 108 may also access and use code and other information in various files, for example, program libraries 118 and real objects 124.

The compiler 106 may be configured to execute a global variable layout (GVL) module 126 and a structure field layout module 128. As discussed further below, the compiler 106 may characterize candidate global variables and structure fields using hotness, affinity and data type information.

In accordance with an embodiment of the invention, the compiler 106 includes a global variable layout (GVL) module 126. As discussed below, the GVL module 126 may be configured to select ordering of variables in a layout of application data.

In accordance with an embodiment of the invention, the compiler 106 includes a structure field layout module 128. As discussed below, the structure field layout may be configured to select ordering of fields with a structure.

Figure 2:
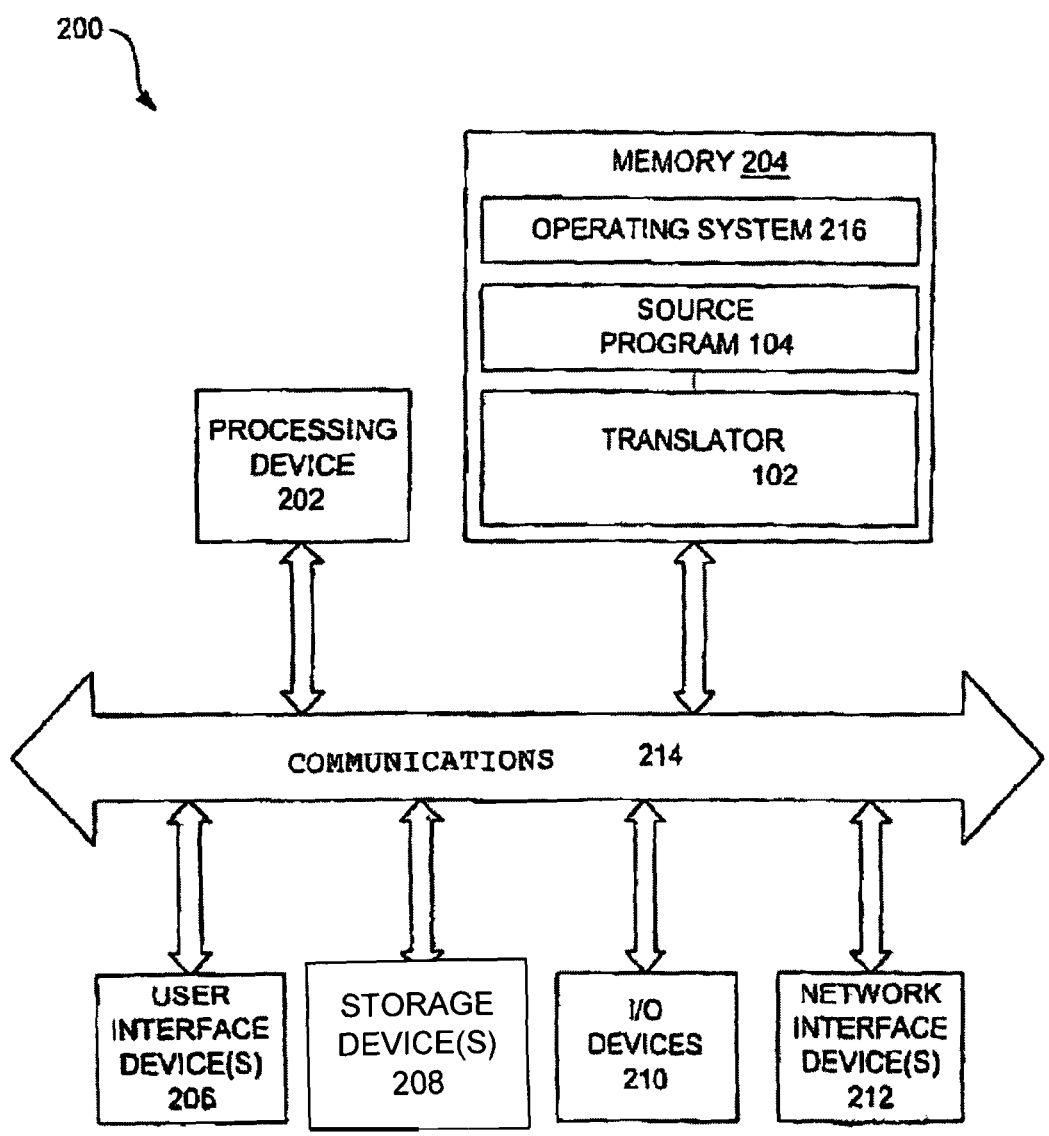
FIG. 2 is a schematic diagram depicting an exemplary computing system on which the translator shown in FIG. 1 may be executed.

FIG. 2 is a schematic diagram depicting an exemplary computing system 200 on which the translator 102 shown in FIG. 1 may be executed. For example, the computing system 200 may comprise a workstation, desktop computer, portable computer, dedicated server computer, multiprocessor computing device, or other type of computing system. The computing system 200 may include a processing device 202, a memory system 204, and various other components. The processing device 202 typically comprises one or more microprocessors. The memory system 204 may comprise various forms of memory and may hold an operating system 216, as well as the translator 102 and the source program 104 to be translated. These various other components may include, for example, user interface device(s) 206, data storage device(s) 208, other input/output devices 210, network interface device(s) 212, and other components. A communications system 214 (for example, comprising one or more communications buses) is used to interface between the various components. While FIG. 2 shows typical components and a generalized configuration for such a computing system 200, the details for such a system will vary according to the implementation.

Figure 3:
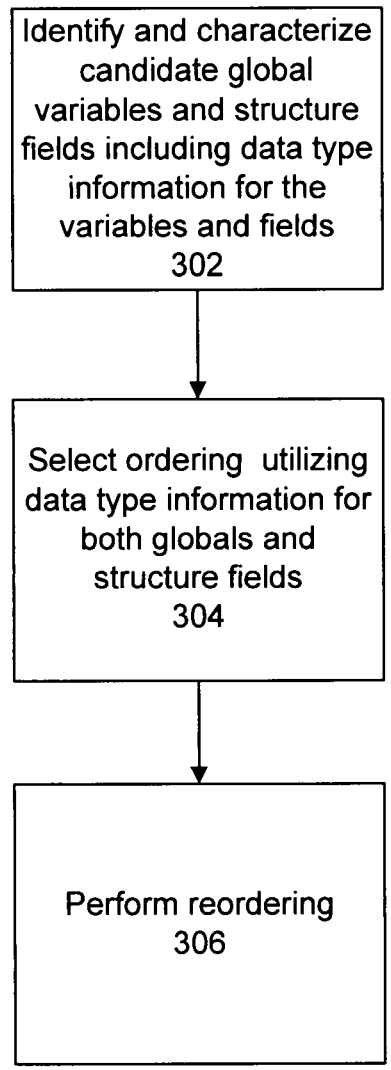
FIG. 3 is a high-level flow chart depicting a method for global variable and structure field layout in accordance with an embodiment of the invention.

FIG. 3 is a high-level flow chart depicting a method 300 for global variable layout and structure field layout utilizing data type information in accordance with an embodiment of the invention. As shown, the method 300 performs the global variable layout and structure field layout in three phases.

In the first phase 302, candidate variables and structure fields are identified and characterized. During this phase 302, data type information is found and recorded for the variables and structure fields. In one implementation, this phase 302 may be performed by the compiler 106. This phase 302 is described in further detail below in relation to FIG. 4.

In the second phase 304, the actual ordering of the variables and structure fields is selected utilizing the aforementioned data type information. In one implementation, this phase 304 may be performed by compiler modules GVL 126 and structure field layout 128. This phase 304 is described in further detail below in relation to FIG. 5.

Finally, in the third phase 306, the reordering is performed. In one implementation, this phase 304 may be performed by the compiler 106. For example, the compiler 106 may use a layout generated by the compiler modules GVL 126 and structure field layout 128 and reorder the global variables or change the definitions of structures to achieve the desired result.

Figure 4:
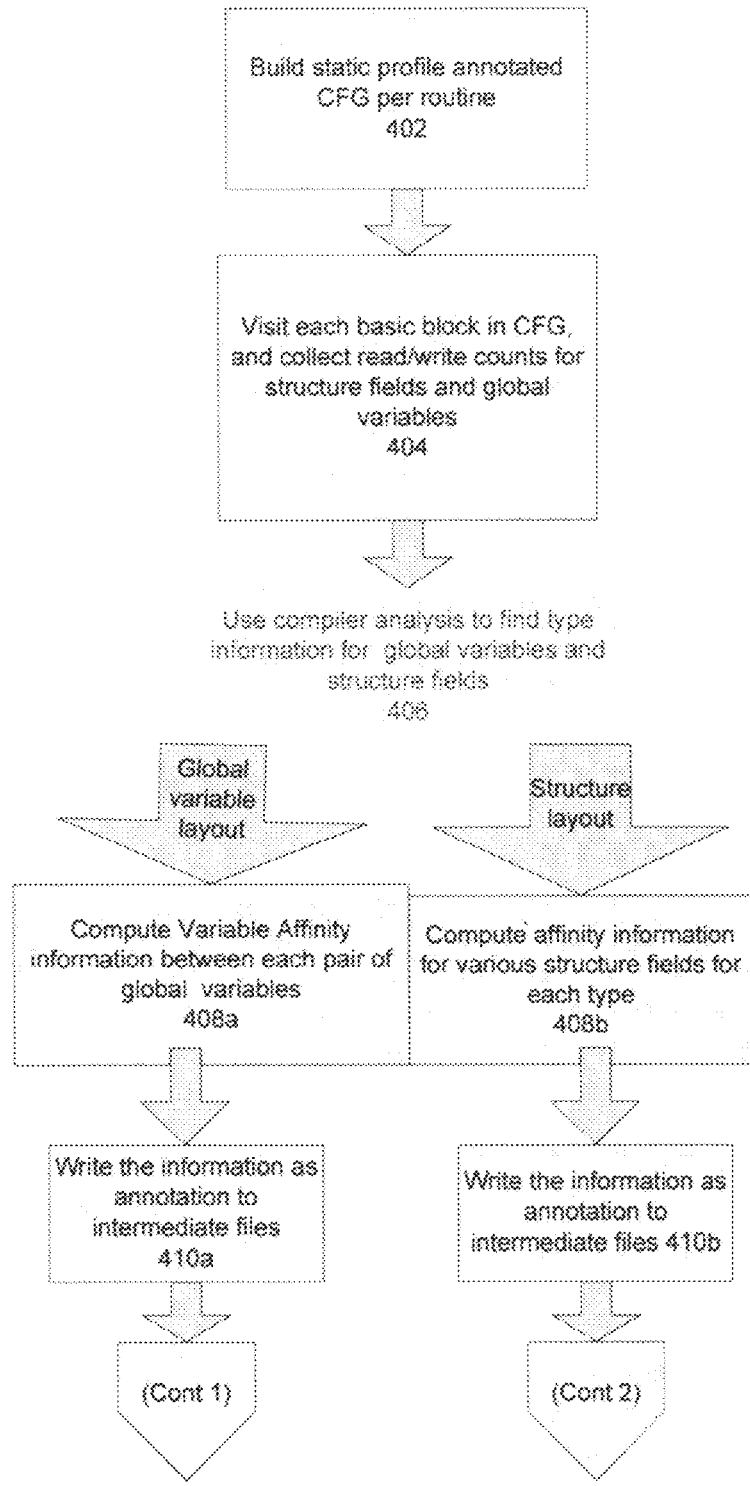
FIG. 4 is a flow chart depicting a procedure for identifying and characterizing candidate variables and structure fields, including finding and writing data type information for the variables and structure fields, in accordance with an embodiment of the invention.

FIG. 4 is a flow chart depicting a procedure 302 for identifying and characterizing candidate variables and structure fields, including data type information for the variables, in accordance with an embodiment of the invention. In one implementation, this procedure 302 may be performed by a compiler 106. Variations of this procedure 302 may also be implemented in accordance with other embodiments of the invention.

Per the first block 402 of FIG. 4, the compiler 106 builds a static-profile-annotated control flow graph (CFG) per routine or procedure of the program. For example, in accordance with one implementation, the static-profile-annotated CFG may be built using block and edge frequencies derived from an execution profile. The execution profile may, for example, be created through the use of static heuristics.

Per the second block 404, the compiler 106 visits each basic block in the CFG. After collecting the set of global variables and structure fields accessed in each block, the compiler 106 collects (and records) read and write access counts for global variables and structure fields accessed in that basic block. The compiler 106 may perform this step by first collecting the set of global variables and structure fields accessed in each block. The compiler 106 may further record, for each variable, the variable name, storage class, size, and alignment requirement and for each structure field, the field name, size, offset and alignment requirement, in the table In the third block 406, the compiler 106 performs an analysis to find type information for each global variable and structure fields and record this information. In accordance with an embodiment of the invention, this type information is used to improve the data layout. This improved placement of application data leads to a reduction in data cache misses and hence for improved performance.

Per the fourth block 408a, the compiler 106 may also compute variable affinity information between each pair of variables. For example, two variables have "temporal affinity" if access to those two variables are likely to take place close together in time. A high temporal affinity makes the two variables good candidates for co-location in the data layout. Per the fifth block 408b, the compiler 106 may also compute affinity information between structure fields for each structure.

Per the sixth block 410a, the variable affinity information is written as annotation to intermediate files. In accordance with an embodiment of the invention, the information that is written includes not only the affinity information for variables computed in block 408a, but also the data type information for variables found in block 406. Per the seventh block 410b, the structure field affinity information is written as annotation to intermediate files. In accordance with an embodiment of the invention, the information that is written includes not only the affinity information for structure fields computed in block 408b, but also the data type information for structure fields found in block 406.

Figure 5:
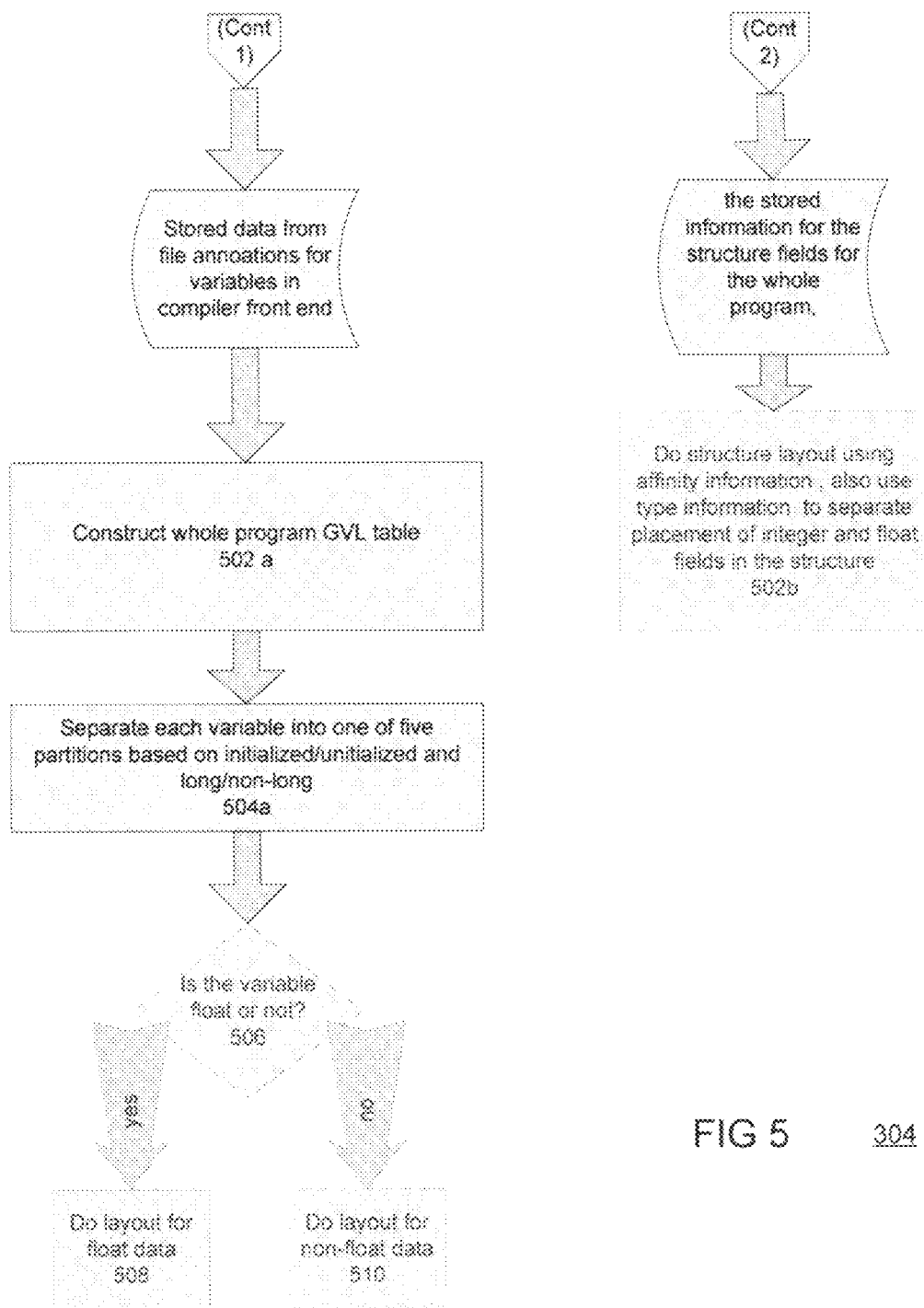
FIG. 5 is a flow chart depicting a procedure for selecting actual ordering of variables and layout of structure fields utilizing data type information in accordance with an embodiment of the invention.

FIG. 5 is a flow chart depicting a procedure 304 for selecting ordering of variables and structure fields utilizing data type information in accordance with an embodiment of the invention. In one implementation, the compiler 106 performs this procedure 304 during final storage allocation for variables. Variations of this procedure 304 may also be implemented in accordance with other embodiments of the invention.

Per block 502a, the compiler 106 constructs a whole program global variable layout (GVL) table. In order to construct the GVL table, the compiler 106 may be configured to start by reading in the execution profile for the program and using the execution profile to construct a call graph. Nodes of the call graph correspond to procedures, and edges between the nodes correspond to dynamic call counts from the profile. The compiler 106 may be further configured to read in the annotation summary sections previously generated by the compiler 106 during the candidate variable identification (i.e. during step 302). In building the GVL table, the compiler 106 may resolve any conflicts relating to size, alignment and storage class. Per block 504a, the candidate variables may then be separated into one of several partitions. In one implementation, for example, five partitions may be used: short read-only variables; long read-only variables; short writable variables; long writable uninitialized variables; and long writable initialized variables.

Block 506 is a branch point indicating that the data layout is performed separately depending on data type information. In particular, this block 506 indicates that the data layout is performed separately for float (see block 508) and non-float (see block 510) data types. In other words, placement decisions are made on the set of floating-point variables based on characteristics such as hotness and affinity amongst the floating-point variables. Separately, placement decisions are made on the set of non-floating-point (i.e. integer) variables based on characteristics such as hotness and affinity amongst the non-floating-point variables.

FIG. 5 also shows the use of data type information in structure layout. Per block 502b, the compiler 106 also reads in the stored annotation information for structure fields and performs structure layout based on the affinity information between structure fields and data type information between structure fields.

The above-disclosed technique for improved data layout using data type information provides better placement of the application data which leads to a reduction in data cache misses, in particular for compiled programs executed on IA-64 processors. The above-disclosed technique solves at least the following problems. These problems do not appear to have been so far recognized or focused upon by previous techniques.

First, basing placement decisions solely on affinity and hotness information, as is conventionally the case, may lead to performance degradation. Using data type information while making placement decisions improves performance, in particular for IA-64 processors. For example, in an IA-64 processor, placing an integer and float data together based on their access affinity may cause integer data held in the level-zero data cache to be invalidated due to the floating point store of the adjacent data. This results in a data cache (dcache) miss for the subsequent access for the integer data. In accordance with an embodiment of the invention, such a dcache miss may be avoided by the optimizer using data type information while making data layout decisions.

Second, program structure definitions and global variables are conventionally co-located by the user (programmer) based on the logical grouping of the fields and data from the application program perspective. Even for performance tuned codes, the placement decisions by the programmer are typically from the perspective of the data being accessed together to avoid cache misses. However, such code does not take into account architectural restrictions for data cache inclusion for different data types. For example, the fact that the level zero data cache may be tied to integer data.

In contrast to previous techniques, the technique disclosed herein uses data type in guiding placement decisions for data layout optimizations. This novel technique is applicable across a wide spectrum of optimizations, such as structure field reordering, structure field splitting, structure inlining, and global variable layout. In accordance with an embodiment of the invention, data cache misses are reduced by a data layout optimization procedure that takes into account the data type of the datums in placing datums accessed together. One particular implementation of the technique achieves superior performance for compiled C and C++ programs executed on the IA-64 processor architecture.

As described in detail above, this technique has been implemented in a compiler as part of the synthetic profile global variable layout (GVL). In this implementation, during GVL, integer and floating point variables are separated by the compiler and laid out separately based on their hotness and affinity. In the high level optimizer first level phase, the data type of the global/static data may be gathered, and this information may be aggregated during the interprocedural analysis phase. Based on the data type, separate partitions are created, for example, for integer and floating-point data. Layout is then determined separately for these data partitions.

In one embodiment of the invention, for cache-conscious structure layout, data type information is taken into account while making placement decisions for the fields in structure field inlining and structure field reordering. In another embodiment of the invention, data type information may be utilized while providing data layout advisory as part of a performance advisor.

Applicants have tested the technique disclosed herein, for example, on the "177.mesa" program from the SPEC2000 floating point benchmarks. Compiling that program taking into account data type in the data layout using the disclosed technique improved performance by about 2% on an IA-64 processor relative to that program compiled without taking into account data type in the data layout.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method comprising:

compiling, by a computer system, a program into an executable file, the compiling comprising:

identifying a plurality of data types of data items in the program, the plurality of data types comprising a first data type and a second data type, wherein the data items comprise variables in the program that are according to the data types;

constructing a global variable layout table for the program based on annotations of the variables generated from computing variable affinity information between each pair of the variables in the program;

creating, using the global variable layout table, a first partition for data items of the first data type, and a second partition for data items of the second data type;

determining an ordering of the data items of the first data type in the first partition based on affinity and hotness characteristics of the data items of the first data type;

separately determining an ordering of the data items of the second data type in the second partition based on affinity and hotness characteristics of the data items of the second data type; and using the orderings in the first and second partitions when placing the data items of the first and second data types into the executable file.

2. The method of claim 1, wherein the executable file is configured to be executed on a processor which provides different levels of caching support for the first and second data types.

3. The method of claim 2, wherein the first data type is a floating-point data type, and the second data type is a non-floating-point data type.

4. The method of claim 3, wherein the processor provides support down to a zero-level cache for the data items of the non-floating-point data type and support down to a first-level cache for the data items of the floating-point data type.

5. The method of claim 4, wherein the processor comprises an IA-64 architecture processor.

6. The method of claim 1, wherein the data items of the first and second data types further include structure fields.

7. A non-transitory computer-readable medium storing computer-executable instructions that upon execution cause a computer system to:

compile a program into an executable file, the compiling comprising:
    identifying a plurality of data types of data items in the program, the plurality of data types comprising a first data type and a second data type, wherein the data items comprise variables in the program that are according to the data types;
    constructing a global variable layout table for the program based on annotations of the variables generated from computing variable affinity information between each pair of the variables in the program;
    creating, using the global variable layout table, a first partition for data items of the first data type, and a second partition for data items of the second data type;
    determine an ordering of the data items of the first data type in the first partition based on affinity and hotness characteristics of the data items of the first data type;
    separately determine an ordering of the data items of the second data type in the second partition based on affinity and hotness characteristics of the data items of the second data type;
    use the orderings when placing the data items of the first and second data types into the executable file;
  use the orderings when placing the data items of the first and second data types into a dynamically allocated memory when the executable file is executed.

8. The non-transitory computer-readable medium of claim 7, wherein the executable file is configured to be executed on a processor which provides different levels of caching support for the first and second data types.

9. The non-transitory computer-readable medium of claim 8, wherein the first data type is a floating-point data type, and the second data type is a non-floating-point data type.

10. The non-transitory computer-readable medium of claim 9, wherein the processor provides support down to a zero-level cache for the data items of the non-floating-point data type and support down to a first-level cache for the data items of the floating-point data.

11. The non-transitory computer-readable medium of claim 10, wherein the processor comprises an IA-64 architecture processor.

12. The non-transitory computer-readable medium of claim 7, wherein the data items of the first and second data types further include structure fields.

13. A system comprising:
  a memory;
  a processor; and
  a non-transitory computer-readable storage medium storing instructions for compiling a program into an executable binary file, the instructions upon execution cause the processor to:
    identify a plurality of data types of data items in the program, the plurality of data types comprising a first data type and a second data type, wherein the data items comprise variables in the program that are according to the data types;
    construct a global variable layout table for the program based on annotations of the variables generated from computing variable affinity information between each pair of the variables in the program;
    create, using the global variable layout table, a first partition for data items of the first data type, and a second partition for data items of the second data type;
    determine an ordering of the data items of the first data type in the first partition based on affinity and hotness characteristics of the data items of the first data type;
    separately determine an ordering of the data items of the second data type in the second partition based on affinity and hotness characteristics of the data items of the second data type; and
    use the orderings in the first and second partitions when placing the data items of the first and second data types into the executable binary file and into the memory.

14. The system of claim 13, wherein the processor is to provide different levels of caching support for the first and second data types.

15. The system of claim 14, wherein the first data type is a floating-point data type, and the second data type is a non-floating-point data type.

16. The system of claim 15, wherein the processor is to provide support down to a zero-level cache for the data items of the non-floating-point data type and support down to a first-level cache for the data items of the floating-point data type.

17. The system of claim 16, wherein the processor comprises an IA-64 architecture processor.

18. The system of claim 13, wherein the data items of the first and second data types further include structure fields.

19. The system of claim 13, wherein the first data type is a floating-point data type, and the second data type is a non-floating-point data type.

* * * * *